United States Patent Office 3,443,004
Patented May 6, 1969

3,443,004
INJECTABLE SOLUTION CONTAINING 6-CHLORO-
OR 6-TRIFLUOROMETHYL-7-SULFAMYL - 1,2,4-
BENZOTHIODIAZINE-1,1-DIOXIDE DIURETIC
Leon Lachman, Millburn, and Carl Richard Rehm, Fanwood, N.J., assignors to Ciba Corporation, New York, N.Y., a corporation of Delaware
No Drawing. Continuation-in-part of application Ser. No. 262,343, Mar. 4, 1963. This application Apr. 8, 1965, Ser. No. 446,727
Int. Cl. A61k 27/00, 9/00
U.S. Cl. 424—228         7 Claims This application is in part a continuation of application S.N. 262,343, filed Mar. 4, 1963, which is in turn in part a continuation of application S.N. 818,004, filed June 4, 1959, both of these applications have been abandoned.

This invention relates to and has for its object the provision of injectable solutions of diuretics of the benzothia diazine-1,1 - dioxide type, useful intravenously or intramuscularly.

Diuretics are, of course, employed to promote the excretion of water and sodium chloride which has accumulated extensively in certain tissues or cavities. These conditions are normally found, for example, in congestive heart failure and cirrhosis of the liver. Xanthene derivatives, originally used as diuretics, were replaced by organic mercurials and it now appears that the benzothiadiazines may be even more advantageously used in the diuretic field. Such compounds have been administered and found to be highly effective for oral use. In some situations, however, it is desirable to have a perenteral form of the drug. Thus, in severe congestive heart failure, where one desires maximum speed of onset of action or in situations where patients are unable to take oral medication (e.g. because of nausea, vomiting, etc.) the perenteral form of a drug must be used.

The benzothiadiazine - 1,1 - dioxides which have been found to be effective in the diuretic field are all extremely insoluble. For example, 6-chloro-7-sulfamyl-3,4-dihydro-2-H-[1,2,4]-benzothiadiazine-1,1-dioxide is soluble to the extent of less than one-tenth of one percent in water. This solubility problem is compounded by the fact that such compounds are readily hydrolized at alkaline and acidic pH levels, with alkaline hydrolysis being more rapid and, therefore, more serious. It has been found that an injectable solution of benzothiadiazine-1,1-dioxide-type diuretics can be provided if one utilizes, as an adjunct material, an N-substituted amide or a combination of such N-substituted amides. These N-substituted amides may be added to provide about 10 to about 40 percent (preferably about 20 to about 30 percent) by weight of the injectable solution by volume. Particularly preferred are those solutions in which the substituted amide comprises about 20 percent by weight of the solution by volume. The concentration of the drug may also be varied to provide for the desirable dosage. It is normally preferable to have the diuretic present in the injectable solution in a concentration of about 1 g. or less (preferably about 0.5 g. or 0.25 g. or less) of the diuretic per each 10 ml. of the injectable solution.

It has now been found that the benzothiadiazine-1,1-dioxide diuretics, dissolved in a medium which contains N-substituted amides in the manner described above, may be stabilized by adding to the solution, in specified amounts, the material 4-amino-6-chloro-m-benzene-disulfoamide or o,p-disulfamylanilline. As used hereinafter, the term 4-amino-6-chloro-m-benzenedisulfonamide is intended to include o,p-disulfamylaniline. The amount of 4-amino-6-chloro-m-benzenedisulfonamide which is added is preferably about 1 to about 50 percent of the amount of benzothiadiazine-1,1-dioxides, both materials being taken by weight. Thus, one may add about 1 to about 50 mg. 4-amino-6-chloro-m-benzene-disulfonamide per each 100 mg. benzothiadiazine-1,1-dioxide in the injectable solution. It is preferred, however, to add about 20 to about 30 percent by weight 4-amino-6-chloro-m-benzene-disulfonamide per unit weight of benzothiadiazine-1,1-dioxide. Thus, it is preferable to add about 20 to about 30 mg. 4-amino-6-chloro-m-benzene-disulfonamide per 100 mg. benzothiadiazine-1,1-dioxide in the injectable solution. Normally, the solutions containing these ingredients are made to contain about 5–100 mg. benzothiadiazine-1,1-dioxide per ml. solution; preferably, about 25 to about 50 mg. benzothiadiazine-1,1-dioxide per ml. solution.

The diuretics used in this invention include benzothiadiazine-1,1-dioxides, more particularly, benz-sulfamyl-3,4-dihydro-2-H - [1,2,4] - benzothiadiazine - 1,1 - dioxides. These include all of the compounds disclosed and encompassed in U.S. Patents Nos. 2,809,194; 3,163,644 and 3,163,645. Specific examples of compounds useful in the invention are 6-chloro-7-sulfamyl-3,4-dihydro-2-H-[1,2,4]-benzothiadiazine-1,1-dioxide, 6-trifluoromethyl-7-sulfamyl-3,4-dihydro-2-H-[1,2,4]-benzothiadiazine - 1,1 - dioxide and derivatives of these compounds substituted in the 3-position by a member selected from the group consisting of methyl, benzyl, cyclopentyl-methyl, cyclohexylmethyl 5-nor-bornenyl-2, dichloromethyl, etc.; another series of specific compounds includes 6-chloro (or trifluoromethyl)-7-sulfamyl - 3,4 - dihydro - 2 - H - [1,2,4]-benzothiadiazine-1,1-dioxide, which is 2-lower alkyl substituted or 2-lower alkyl (particularly methyl)-substituted and additionally 3-substituted by a substituent, such as halo-lower alkyl (particularly monochloromethyl), 2,2, 2-trifluoroethylthiomethyl, etc.

The N-substituted amides which may be used in the compositions of the invention are preferably N-substituted or N,N-disubstituted amides of lower aliphatic acids, such as formic, acetic, propionic, butyric, sec-butyric, pentanoic, 2-methyl butyric, trimethylacetic, hexanoic, heptanoic, etc., also, chloracetic acid, chlorpropionic acid, dichloracetic acid, β-hydroxy propionic acid, etc. The substituent on the amide nitrogen is preferably an alkyl substituent, especially a lower alkyl substituent, such as methyl, ethyl, isopropyl, propyl, butyl, hexyl, etc., but may be any other aliphatic substituent, such as β-hydroxyethyl, β-chlorethyl, etc., or an aromatic substituent, such as phenyl, tolyl, chlorophenyl, etc., or an aralkyl substituent, such as benzyl, phenethyl, chlorbenzyl, etc. Where polycarboxylic acids are used, there may be additional N-substituents on the amide nitrogen atoms. Thus, with dicarboxylic acids (particularly lower alkylene dicarboxylic acids), such as succinic acid, adipic acid, etc., one may have up to four substituents, such as lower alkyl substituents, on the amino nitrogen atoms. In addition, N-substituted and disubstituted ureas are included within the purview of the invention, as are the analogous trisubstituted and tetrasubstituted ureas, etc. Thus, ureas, containing the same substituents as those mentioned above, may be employed in the invention. Specific examples of the substituted amides which may be used in the invention are N- or N,N-lower alkyl substituted lower fatty acid amides, such as N-methylacetamide; N,N-dimethylacetamide; N,N-diethylpropionamide; N,N-dibutylpropionamide; N-amylpropionamide; N,N-dimethylbutyramide; N-ethylbutyramide; ureas substituted on at least one nitrogen atom by a hydrocarbon substituent (particularly a lower alkyl substituent), such as N,N-dimethylurea; N,N'-dimethylurea; N,N,N'-tetramethylurea; N,N-diethylurea; N,N-diethyl thiourea; N,N,N',N'-tetraethylurea; N,N-dipropylurea, etc. One may also use N-mono- or polysubstituted (especially lower alkyl-substituted) amides of lower alkylene dicarboxylic acids, such as N,N,N',N'-tetramethyl fumaramide; N,N-dimethyl fumaramide; N,N,N',N'-tetramethyl succinamide; N,N'-diisopropyl succinamide; N,N,N',N'-tetramethyl glutaramide; N,N-diethyl adipamide, N-butyl adipamide, etc. In addition, one may use benzene mono- and dicarboxylic acid amides wherein at least one nitrogen atom is substituted (especially lower alkyl phthalamides). Examples of such compounds are N,N,N',N'-tetramethylphthalamide; N,N'-dimethylphthalamide; N-methylphthalamide; N,N'-diethylphthalamide; are lower alkyl, e.g. di-lower alkyl phthalamides or tetraly those wherein the substituents on the nitrogen atom amide; N,N,N',N'-tetramethyl isophthalamide; N,N,N',N'-tetrabutyl isophthalamide; N,N,N',N'-tetramethyl terephthalamide; N,N-dipropyl terephthalamide; etc. In addition, one may advantageously utilize other amides, such as N-lower alkylated xanthines, e.g. 1,3,7-trimethylxanthine; 1,3,7-tributylxanthine; 1,3-dimethylxanthine; 3,7-dimethylxanthine; etc., or one may use N-substituted amide polymers, such as polyvinyl pyrrolidone, etc.

In addition to the diuretic and substituted amide components of the injectable solutions, as well as the water for injection, of course, one may desirably add other ingredients, such as stabilizers, buffering agents, etc. The stabilizers which may be used include antioxidants, such as thiourea, sodium sulfite, sodium metabisulfite, ascorbic acid, cysteine hydrochloride, sodium formaldehyde sulfoxylate; monothioglycerol, thiosorbitol, and buffering combinations, such as acetic acid-sodium acetate; potassium acid phthalate-sodium hydroxide; potassium acid phosphate-disodium phosphate; potassium acid phosphate-sodium hydroxide; etc. It is desirable to maintain a pH below about 7, preferably at the about 4–7 level and any buffers yielding such pH may be utilized as stabilizers and poly-lower alkylene glycols (mol weight about 300–20,000), especially polyethylene glycols, may be added, preferably in amounts of about 5 to about 30 percent of the compositions, to aid in solubilizing the compositions.

Following are working examples, illustrative of, but in no way intended to limit the present invention. Unless otherwise indicated, all parts, wherever given in the specification, are parts by weight.

EXAMPLE 1

Material and formula: 1000 ml.
6 - chloro - 3,4 - dihydro - 7 - sulfamyl - 2H-
  1,2,4 - benzothiadiazine - 1,1 - dioxide(hydrochlorothiazide) _____grams__ 50.0
4-amino-6-chloro-m-benzenedisulfonamide _____grams__ 15.0
N,N-dimethylacetamide _____ml__ 200.0
Polyvinylpyrrolidone (Plasdone C) __grams__ 40.0
Polyethylene glycol 300 _____ml__ 150.0
Dimethyl urea _____grams__ 50.0
Acetic acid _____do____ 19.0
Sodium acetate _____do____ 6.5
Thiourea _____do____ 1.0
Water for injection, q.s. 1000.0 ml.

Procedure for preparation

Dissolve the hydrochlorothiazide and 4-amino-6-chloro-m-benzenedisulfonamide in the N,N-dimethylacetamide. Then add the dimethyl urea and thiourea and mix until a solution is obtained. Add the Plasdone C and mix well. Then add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

In place of the 15.0 grams of 4-amino-6-chloro-m-benzenedisulfonamide one may use about 25, 10, 5, 2, 1 or even about 0.5 g. of this compound to obtain stabilization.

EXAMPLE 2

Using the identical procedure and composition as that used in Example 1, except that 6-chloro-3,4-dihydro-2-methyl-7-sulfamyl-2H-1,2,4-benzothiadiazine-1,1 - dioxide is substituted for the 6-chloro-3,4-dihydro-7-sulfamyl-2H-1,2,4-benzothiadiazine-1,1-dioxide, one may prepare the analogous compositions.

EXAMPLE 3

Using the identical procedure and composition as that used in Example 1, except that 6-chloro-7-sulfamyl-1,2,4-benzothiadiazine-1,1-dioxide is substituted for the 6-chloro-3,4-dihydro-7-sulfamyl-2H-1,2,4 - benzothiadiazine - 1,1-dioxide, one may prepare the analogous compositions.

EXAMPLE 4

Material and formula: 1000 ml.
6 - chloro - 3,4 - dihydro - 7 - sulfamyl - 2H-
  1,2,4 - benzothiadiazine - 1,1 - dioxide(hydrochlorothiazide) _____grams__ 50.0
4-amino-6-chloro-m-benzenedisulfonamide _____grams__ 15.0
N,N-dimethylacetamide _____ml__ 200.0
Polyvinylpyrrolidone (Plasdone C) __grams__ 40.0
Urea _____do____ 100.0
Polyethylene glycol 300 _____ml__ 200.0
Acetic acid _____ml__ 19.0
Sodium acetate _____ml__ 6.5
Water for injection, q.s. 1000.0 ml.

Procedure for preparation

Dissolve the hydrochlorothiazide and 4-amino-6-chloro-m-benzenedisulfonamide in the N,N-dimethylacetamide. Then add the urea and mix until a solution is obtained. Add the Plasdone C and mix well. Then add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 5

Using the identical procedure and composition as that used in Example 4, except that 6-chloro-3,4-dihydro-2-methyl-7-sulfamyl-2H-1,2,4-benzothiadiazine - 1,1 - dioxide is substituted for the 6-chloro-3,4-dihydro-7-sulfamyl-2H-1,2,4-benzothiadiazine-1,1-dioxide, one may prepare the analogous composition.

EXAMPLE 6

Using the identical procedure and composition as that used in Example 4, except that 6-chloro-7-sulfamyl-1,2,4-benzothiadiazine-1,1-dioxide is substituted for the 6-chloro-3,4-dihydro-7-sulfamyl-2H-1,2,4-benzothiadiazine-1,1-dioxide, one may prepare the analogous compositions.

EXAMPLE 7

Using the identical procedure and composition as that used in Example 4, except that citric acid and sodium citrate are substituted for the acetic acid and sodium acetate, respectively, of the reference example, one may prepare the analogous compositions.

EXAMPLE 8

Material and formula: 100 ml.

| | |
|---|---|
| 6 - chloro - 3,4 - dihydro - 7 - sulfamyl - 2H-1,2,4 - benzothiadiazine - 1,1 - dioxide (hydrochlorothiazide) _____grams__ | 50.0 |
| 4-amino-6-chloro-m-benzenedisulfonamide _____grams__ | 200.0 |
| N,N-dimethylacetamide _____ml__ | 200.0 |
| Polyvinylpyrollidone (Plasdone C) __grams__ | 40.0 |
| Urea _____do____ | 50.0 |
| Polyethylene glycol 300 _____ml__ | 200.0 |
| Urethane _____grams__ | 50.0 |
| Acetic acid _____do____ | 19.0 |
| Sodium acetate _____do____ | 6.5 |
| Sodium sulfite _____do____ | 1.0 |
| Water for injection, q.s. 1000.0 ml. | |

Procedure for preparation

Dissolve the hydrochlorothiazide and 4-amino-6-chloro-m-benzenedisulfonamide in the N,N-dimethylacetamide. Then add the urea and urethane and mix until a solution is obtained. Add the Plasdone C and mix well. Then add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Then add the sodium sulfite in 100 ml. of water for injection to the resulting mixture. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 9

Material and formula: 1000 ml.

| | |
|---|---|
| 6 - chloro - 3,4-dihydro-7-sulfamyl-2H-1,1,4-benzothiadiazine - 1,1 - dioxide (hydrochlorothiazide) _____grams__ | 50.0 |
| 4 - amino - 6 - chloro - m-benzenedisulfonamide _____grams__ | 15.0 |
| N,N-dimethylacetamide _____ml__ | 200.0 |
| Polyvinylpyrollidone (Plasdone C) __grams__ | 40.0 |
| Urea _____do____ | 50.0 |
| Polyethylene glycol 300 _____ml__ | 200.0 |
| Acetamide _____grams__ | 50.0 |
| Acetic acid _____do____ | 19.0 |
| Sodium acetate _____do____ | 6.5 |
| Sodium metabisulfite _____do____ | 1.0 |
| Water for injection, q.s. 1000.0 ml. | |

Procedure for preparation

Dissolve the hydrochlorothiazide and 4-amino-6-chloro-m-benzenedisulfonamide in the N,N-dimethylacetamide. Then add the urea and acetamide and mix until a solution is obtained. Add the Plasdone C and mix well. Then add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Then add the sodium metabisulfite in 100 ml. of water for injection to the resulting mixture. Stir until clear solution results. Bring up to volume with water for injection to the resulting mixture. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 10

Material and formula 100 ml.

| | |
|---|---|
| 6 - chloro - 3,4-dihydro-7-sulfamyl-2H-1,2,4-benzothiadiazine - 1,1 - dioxide (hydrochlorothiazide) _____grams__ | 5.0 |
| 4 - amino - 6 - chloro - m-benzenedisulfonamide _____grams__ | 1.5 |
| N,N-dimethylacetamide _____ml__ | 20.0 |
| Niacinamide _____grams__ | 10.0 |
| Polyethylene glycol 300 _____ml__ | 15.0 |
| Water for injection, q.s. 100.0 ml. | |

Procedure for preparation

Dissolve the hydrochlorothiazide and 4-amino-6-chloro-m-benzenedisulfonamide in the N,N-dimethylacetamide. Then add the niacinamide and, finally, the polyethylene glycol 300 to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 11

Material and formula 100 ml.

| | |
|---|---|
| 6 - chloro - 3,4-dihydro-7-sulfamyl-2H-1,2,4-benzothiadiazine - 1,1 - dioxide (hydrochlorothiazide) _____grams__ | 5.0 |
| 4 - amino - 6 - chloro - m-benzenedisulfonamide _____ | 1.5 |
| N,N-dimethylacetamide _____ml__ | 20.0 |
| N,N,N',N'-tetramethylurea _____ml__ | 10.0 |
| Water for injection, q.s. 100.0 ml. | |

Procedure for preparation

Dissolve the hydrochlorothiazide and 4-amino-6-m-benzenedisulfonamide in the N,N-dimethylacetamide. Then add the N,N,N',N'-tetramethylurea to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 12

Using the identical procedure and composition as that used in Example 11, except that 6-chloro-3,4-dihydro-2-methyl - 7-sulfamyl-2H-1,2,4-benzothiadiazine-1,1-dioxide is substituted for the 6-chloro-3,4-dihydro-7-sulfamyl-2H-1,2,4-benzothiadiazine-1,1-dioxide, one may prepare the analogous compositions.

EXAMPLE 13

Using the identical procedure and composition as that used in Example 11, except that 6-chloro-7-sulfamyl-1,2,4-benzothiadiazine-1,1-dioxide is substituted for the 6 - chloro - 3,4-dihydro-7-sulfamyl-2H-1,2,4-benzothiadiazine-1,1-dioxide, one may prepare the analogous compositions.

EXAMPLE 14

Material and formula: 100 ml.

| | |
|---|---|
| 6 - chloro - 3,4-dihydro-7-sulfamyl-2H-1,2,4-benzothiadiazine - 1,1 - dioxide (hydrochlorothiazide) _____grams__ | 5.0 |
| 4 - amino - 6 - chloro - m-benzenedisulfonamide _____grams__ | 1.5 |
| N,N-dimethylacetamide _____ml__ | 10.0 |
| N,N,N',N'-tetraethylurea _____ml__ | 10.0 |
| Water for injection, q.s. 100.0 ml. | |

Procedure for preparation

Dissolve the hydrochlorothiazide and 4-amino-6-chloro-m-benzenedisulfonamide in the N,N-dimethylacetamide. Then add the N,N,N',N'-tetraethylurea to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 15

Using the identical procedure and composition as that used in Example 14, except that 6-chloro-3,4-dihydro-2-methyl - 7 - sulfamyl-2H-1,2,4-benzothiadiazine-1,1-dioxide is substituted for the 6-chloro-3,4-dihydro-7-sulfamyl - 2H - 1,2,4-benzothiadiazine-1,1-dioxide, one may prepare the analogous composition.

EXAMPLE 16

Using the identical procedure and composition as that used in Example 14, except that 6-chloro-3,4-dihydro-2-methyl - 7-sulfamyl-2H-1,2,4-benzothiadiazine-1,1-dioxide is substituted for the 6-chloro-3,4-dihydro-7-sulfamyl-2H-1,2,4-benzothiadiazine-1,1-dioxide, one may prepare the analogous composition.

EXAMPLE 17

Material and formula: 1000 ml.

| | |
|---|---|
| 6-chloro - 3,4 - dihydro-7-sulfamyl-2H-1,2,4-benzothiadiazine - 1,1 - dioxide (hydrochlorothiazide) _____grams__ | 50.0 |
| 4 - amino - 6 - chloro-m-benzenedisulfonamide _____do____ | 15.0 |
| N,N-dimethylacetamide _____ml__ | 200.0 |
| Polyethylene glycol 300 _____do____ | 250.0 |
| Dimethyl urea _____grams__ | 50.0 |
| Acetic acid _____do____ | 19.0 |
| Sodium acetate _____do____ | 6.5 |
| Thiourea _____do____ | 1.0 |
| Water for injection, q.s. 1000.0 ml. | |

Procedure for preparation

Dissolve the hydrochlorothiazide and 4-amino-6-chloro-m-benzenedisulfonamide in the N,N-dimethylacetamide. Then add the dimethyl urea and thiourea and mix until a solution is obtained. Add the polyethylene glycol 300 and stir. Disolve the sodium acetate in 100 ml. of water for injection and add to the hydrochlorothiazide solution and mix well. Add the acetic acid to 100 ml. of water for injection and add to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

In place of the 15.0 grams of 4-amino-6-chloro-m-benzene disulfonamide one may use about 25, 10, 5, 2, 1 or even about 0.5 g. of this compound to obtain stabilization.

EXAMPLE 18

Using the identical procedure and composition as that used in Example 1, except that 6-chloro-3,4-dihydro-2-methyl-7-sulfamyl - 2H - 1,2,4 - benzothiadiazine-1,1-dioxide is substituted for the 6-chloro-3,4-dihydro-7-sulfamyl-2H-1,2,4-benzothiadiazine-1,1-dioxide, one may prepare the analogous compositions.

EXAMPLE 19

Using the identical procedure and composition as that used in Example 1, except that 6-chloro-7-sulfamyl-1,2,4-benzothiadiazine-1,1-dioxide is substituted for the 6-chloro - 3,4 - dihydro-7-sulfamyl-2H-1,2,4-benzothiadiazine-1,1-dioxide, one may prepare the analogous compositions.

EXAMPLE 20

Material and formula: 1000 ml.

| | |
|---|---|
| 6-chloro - 3,4 - dihydro-7-sulfamyl-2H-1,2,4-benzothiadiazine - 1,1 - dioxide (hydrochlorothiazide) _____grams__ | 50.0 |
| 4 - amino - 6 - chloro-m-benzenedisulfonamide _____do____ | 15.0 |
| N,N-dimethylacetamide _____ml__ | 200.0 |
| Urea _____grams__ | 100.0 |
| Polyethylene glycol 300 _____ml__ | 300.0 |
| Acetic acid _____grams__ | 19.0 |
| Sodium acetate _____do____ | 6.5 |
| Water for injection, q.s. 1000.0 ml. | |

Procedure for preparation

Dissolve the hydrochlorothiazide and 4-amino-6-chloro-m-benzenedisulfonamide in the N,N-dimethylacetamide. Then add the urea and mix until a solution is obtained. Add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 21

Using the identical procedure and composition as that used in Example 4, except that 6-chloro-3,4-dihydro-2-methyl-7-sulfamyl - 2H - 1,2,4 - benzothiadiazine-1,1-dioxide is substituted for the 6-chloro-3,4-dihydro-7-sulfamyl-2H-1,2,4-benzothiadiazine-1,1-dioxide, one may prepare the analogous composition.

EXAMPLE 22

Using the identical procedure and composition as that used in Example 4, except that 6-chloro-7-sulfamyl-1,2,4-benzothiadiazine-1,1-dioxide is substituted for the 6-chloro-3,4-dihydro-7-sulfamyl - 2H - 1,2,4 - benzothiadiazine-1,1-dioxide, one may prepare the analogous compositions.

EXAMPLE 23

Using the identical procedure and composition as that used in Example 4, except that citric acid and sodium citrate are substituted for the acetic acid and sodium acetate, respectively, of the reference example, one may prepare the analogous compositions.

EXAMPLE 24

Material and formula: 1000 ml.

| | |
|---|---|
| 6-chloro - 3,4 - dihydro-7-sulfamyl-2H-1,2,4-benzothiadiazine - 1,1 - dioxide (hydrochlorothaizide) _____grams__ | 50.0 |
| 4 - amino - 6 - chloro-m-benzenedisulfonamide _____do____ | 15.0 |
| N,N-dimethylacetamide _____ml__ | 200.0 |
| Urea _____grams__ | 50.0 |
| Polyethylene glycol 300 _____ml__ | 300.0 |
| Urethane _____grams__ | 50.0 |
| Acetic acid _____do____ | 19.0 |
| Sodium acetate _____do____ | 6.5 |
| Sodium sulfite _____do____ | 1.0 |
| Water for injection, q.s. 1000.0 ml. | |

Procedure for preparation

Dissolve the hydrochlorothiazide and 4-amino-6-chloro-m-benzenedisulfonamide in the N,N-dimethylacetamide. Then add the urea and urethane and mix until a solution is obtained. Add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Then add the sodium sulfite in 100 ml. of water for injection to the resulting mixture. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

EXAMPLE 25

Material and formula: 1000 ml.

| | |
|---|---|
| 6-chloro - 3,4 - dihydro-7-sulfamyl-2H-1,2,4-benzothiadiazine - 1,1 - dioxide (hydrochlorothiazide) _____grams__ | 50.0 |
| 4 - amino - 6 - chloro-m-benzenedisulfonamide _____do____ | 15.0 |
| N,N-dimethylacetamide _____ml__ | 200.0 |
| Urea _____grams__ | 50.0 |
| Polyethylene glycol 300 _____ml__ | 300.0 |
| Acetamide _____grams__ | 50.0 |
| Acetic acid _____do____ | 19.0 |
| Sodium acetate _____do____ | 6.5 |
| Sodium metabisulfite _____do____ | 1.0 |
| Water for injection, q.s. 1000.0 ml. | |

Procedure for preparation

Dissolve the hydrochlorothiazide and 4-amino-6-chloro-m-benzenedisulfonamide in the N,N-dimethylacetamide. Then add the urea and acetamide and mix until a solution is obtained. Add the polyethylene glycol 300 and stir. Dissolve the sodium acetate in 100 ml. of water for injection and add to the hydrochlorothiazide solution and mix well. Add the acetic acid to 100 ml. of water for injection and add to the hydrochlorothiazide solution. Then add the sodium metabisulfite in 100 ml. of water for injection to the resulting mixture. Stir until clear solution results. Bring up to volume with water for injection. Stir until clear solution results. Bring up to volume with water for injection. Pass nitrogen gas through finished solution for 30 minutes. Filter solution through a medium porosity filter. Fill into ampuls that have been previously flushed with nitrogen gas. Sterilize at 115°, 10 p.s.i. for 30 minutes.

Obviously, in preparing the compositions of the invention, one may substitute an equivalent amount of another diuretic thiazide for the one shown in each of the examples. Thus, for example, in place of each 50 grams of 6 - chloro - 3,4 - dihydro-7-sulfamyl-2H-1,2,4-benzothiadiazine-1,1-dioxide one may substitute (1) 500 grams 6-chloro-7-sulfamyl - 1,2,4 - benzothiadiazine-1,1-dioxide,
(2) 5 grams of 6-chloro - 3 - chloromethyl - 2 - methyl-7-sulfamyl-3,4-dihydro-1,2,4-benzothiadiazine-1,1-dioxide,
(3) 2 grams of 2-methyl-3,4-dihydro - 3 - (2,2,2-trifluoroethylthiomethyl)-6-chloro-7-sulfamyl - 1,2,4-benzothiadiazine-1,1-dioxide,
(4) 2 grams of 3-dichloromethyl-6-chloro-7-sulfamyl-3,4-dihydro-1,2,4-benzothiadiazine-1,1-dioxide,
(5) 1 gram of 6 - chloro-3,4-dihydro-3-[5-nor-bornen-2-yl]-7-sulfamyl-1,2,4-benzothiadizine-1,1-dioxide,
(6) 5 grams of 3-benzyl-3,4-dihydro-6-(trifluoromethyl)-2H-1,2,4-benzothiadiazine-7-sulfonamide-1,1-dioxide,
(7) 50 grams of 6-trifluoromethyl-3,4-dihydro-7-sulfamyl-2H-1,2,4-benzothiadiazine-1,1-dioxide, etc.

Obviously, one may also substitute an equivalent amount of o,p-disulfamyl aniline for the 4-amino-6-chloro-m-benzenedisulfonamide shown in the examples.

What is claimed is:

1. An injectable aqueous solution comprising an effective amount up to about 0.1 gram of a 6-chloro- or 6-trifluoromethyl - 7 - sulfamyl-1,2,4-benzothiadiazine-1,1-dioxide diuretic, about 0.002 to about 0.050 gram 4-amino-6-chloro-m-benzenedisulfonamide, and about 10 to about 40 percent by weight of at least one N-lower alkylamide or N,N-di-lower alkylamide of a lower aliphatic or benzene mono- or dicarboxylic acid, per milliliter of solution buffered to pH about 4 to 7.

2. An injectable aqueous solution comprising an effective amount of up to about 0.1 gram of a 6-chloro- or 6-trifluoromethyl - 7 - sulfamyl-1,2,4-benzothiadiazine-1,1-dioxide diuretic, about 0.002 to about 0.050 gram 4-amino-6-chloro-m-benzenedisulfonamide, about 10 to about 40 percent by weight of at least one N-lower alkylamide or N,N-di-lower alkylamide of a lower aliphatic or benzene mono- or dicarboxylic acid and about 5 to about 30 percent by weight of a poly-lower alkylene glycol having a molecular weight about 300 to about 20,000, per milliliter of solution buffered to pH about 4 to 7.

3. An injectable aqueous solution comprising an effective amount up to about 0.1 gram of a 6-chloro- or 6-trifluoromethyl - 7 - sulfamyl-1,2,4-benzothiadiazine-1,1-dioxide diuretic, about 0.025 gram 4-amino-6-chloro-m-benzenedisulfonamide, about 10 to about 40 percent by weight of at least one N-lower alkylamide or N,N-di-lower alkylamide of a lower aliphatic or benzene mono- or dicarboxylic acid and about 5 to about 30 percent by weight of a polyethylene glycol having a molecular weight about 300 to about 20,000, per milliliter of solution buffered to pH about 4 to 7.

4. An injectable aqueous solution comprising an effective amount up to about 0.1 gram of 6-chloro-7-sulfamyl-3,4 - dihydro - 2-H-[1,2,4]-benzothiadiazine-1,1-dioxide, about 0.002 to about 0.050 gram 4-amino-6-chloro-m-benzenedisulfonamide, and about 10 to about 40 percent by weight of at least one N-lower alkylamide or N,N-di-lower alkylamide of a lower aliphatic or benzene mono- or dicarboxylic acid, per milliliter of solution buffered to pH about 4 to 7.

5. An injectable aqueous solution comprising an effective amount up to about 0.1 gram of 6-chloro-7-sulfamyl-1,2,4-benzothiadiazine-1,1-dioxide, about 0.002 to about 0.050 gram 4-amino-6-chloro-m-benzenedisulfonamide, and about 10 to about 40 percent by weight of at least one N-lower alkylamide or N,N-di-lower alklamide of a lower aliphatic or benzene mono- or dicarboxylic acid, per milliliter of solution buffered to pH about 4 to 7.

6. An injectable aqueous solution comprising about 0.05 to about 0.025 gram of 6-chloro-7-sulfamyl-3,4-dihydro - 2 - H[1,2,4] - benzothiadiazone-1,1-dioxide, about 0.010 to about 0.015 gram 4-amino-6-chloro-m-benzenedisulfonamide, and about 20 percent by weight of at least one N-lower alkylamide or N,N-di-lower alkylamide of a lower aliphatic or benzene mono- or dicarboxylic acid, per milliliter of solution buffered to pH about 4 to 7.

7. An injectable aqueous solution comprising about 0.05 gram of 6-chloro-7-sulfamyl-3,4-dihydro-2-H-[1,2,4]-benzothiadiazine-1,1-dioxide, about 0.010 to about 0.015 gram 4-amino-6-chloro-m-benzenedisulfonamide, about 20 percent by weight of N,N-dimethylacetamide and about 15 percent by weight of a polyethylene glycol having a molecular weight about 300.

References Cited

UNITED STATES PATENTS

| | | |
|---|---|---|
| 2,809,194 | 10/1957 | Novello. |
| 1,921,722 | 8/1933 | Berendes et al. |
| 2,027,905 | 1/1936 | Goth. |

FOREIGN PATENTS

| | | |
|---|---|---|
| 325,847 | 2/1930 | Great Britain. |
| 485,569 | 5/1938 | Great Britain. |

OTHER REFERENCES

Chemical Abstract I, vol. 50, col. 7126(i)–7127(a), 1956.
Chemical Abstract II, vol. 50, col. 9627(b), 1956.
Chemical Abstract III, vol. 50, col. 13829(f–g), 1956.
Chemical Abstract IV, vol. 50, col. 14179(b), 1956.
Chemical Abstract V, vol. 50, col. 14834(d), 1956.
New and Nonofficial Drugs for 1963, pp. 802–805, 810–812.

ALBERT T. MEYERS, *Primary Examiner.*

J. D. GOLDBERG, *Assistant Examiner.*

U.S. Cl. X.R.

424—246, 320, 324